(12) United States Patent
Oliver et al.

(10) Patent No.: US 6,382,371 B1
(45) Date of Patent: May 7, 2002

(54) SELF LEVELING VEHICLE SUSPENSION DAMPER

(75) Inventors: Michael L. Oliver, Xenia; William C. Kruckemeyer, Beavercreek, both of NY (US); Ronald G. Smith, Jr., New Carlisle, OH (US); Eric L. Jensen, Dayton, OH (US); Troy A. Miller, Xenia, OH (US)

(73) Assignee: Delphi Technologies, Inc., Troy, MI (US)

(*) Notice: Subject to any disclaimer, the term of this patent is extended or adjusted under 35 U.S.C. 154(b) by 0 days.

(21) Appl. No.: 09/770,125

(22) Filed: Jan. 26, 2001

(51) Int. Cl.[7] .................................................. F16F 9/00
(52) U.S. Cl. .................. 188/318; 188/315; 188/322.15; 188/269
(58) Field of Search ........................ 267/64.11, 286, 267/64.15, 64.13, 64.16; 188/269, 282.1, 282.5, 282.8, 282.7, 282.6, 286, 322.14, 322.13, 322.15–322.19, 316, 317, 315, 318

(56) References Cited

U.S. PATENT DOCUMENTS 4,054,277 A * 10/1977 Sirven ..................... 188/315 X
4,502,672 A * 3/1985 Meller et al. ............. 267/64.17
6,318,526 B1 * 11/2001 Kruckenmeyer et al. ..................... 188/322.17

* cited by examiner

Primary Examiner—Pam Rodriguez
Assistant Examiner—Melanie Torres
(74) Attorney, Agent, or Firm—Scott A. McBain

(57) ABSTRACT

A suspension damper assembly capable of adjusting the height of an automobile includes a cylinder tube defining a pumping chamber aligned concentrically within a reservoir tube. A fluid reservoir is defined between the reservoir tube and the cylinder tube. A piston is slideably disposed within the cylinder tube. A gas cup is slideably disposed within the assembly and separates a fluid chamber within the cylinder tube from a gas chamber. The gas cup includes a cup conduit connecting the pumping chamber to the reservoir chamber whereby stroking the gas cup pumps fluid into the pumping chamber increasing the outward force of the piston for raising the height of the vehicle. A piston shaft guide includes a shaft valve allowing fluid to pass from the pumping chamber to the reservoir chamber for reducing the outward force of the piston and lowering the height of the vehicle.

25 Claims, 6 Drawing Sheets

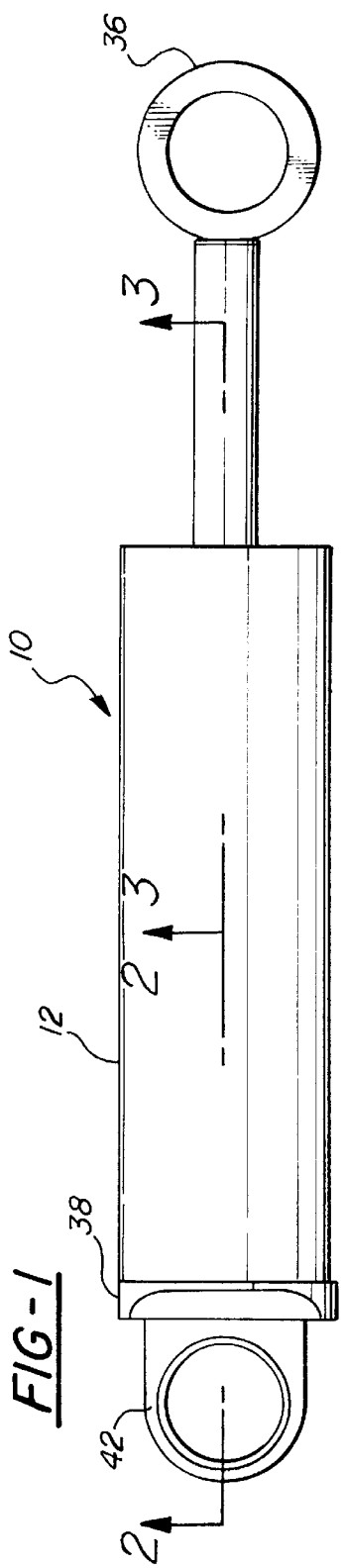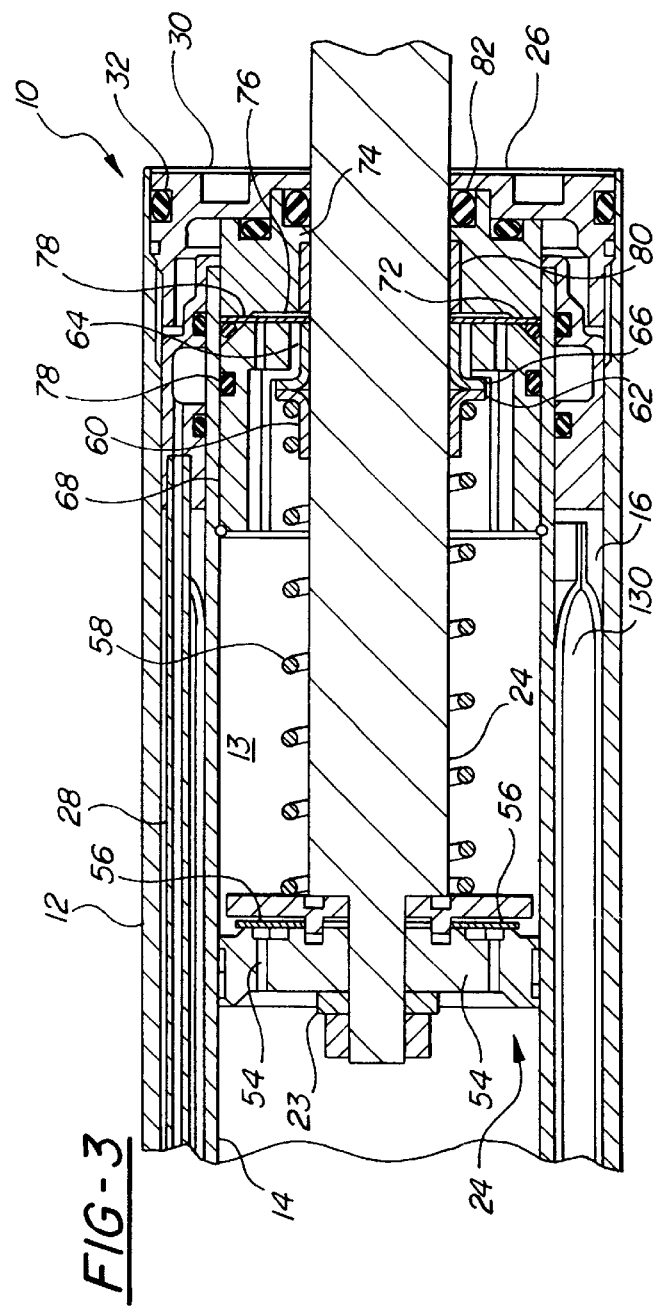
FIG-1
FIG-3

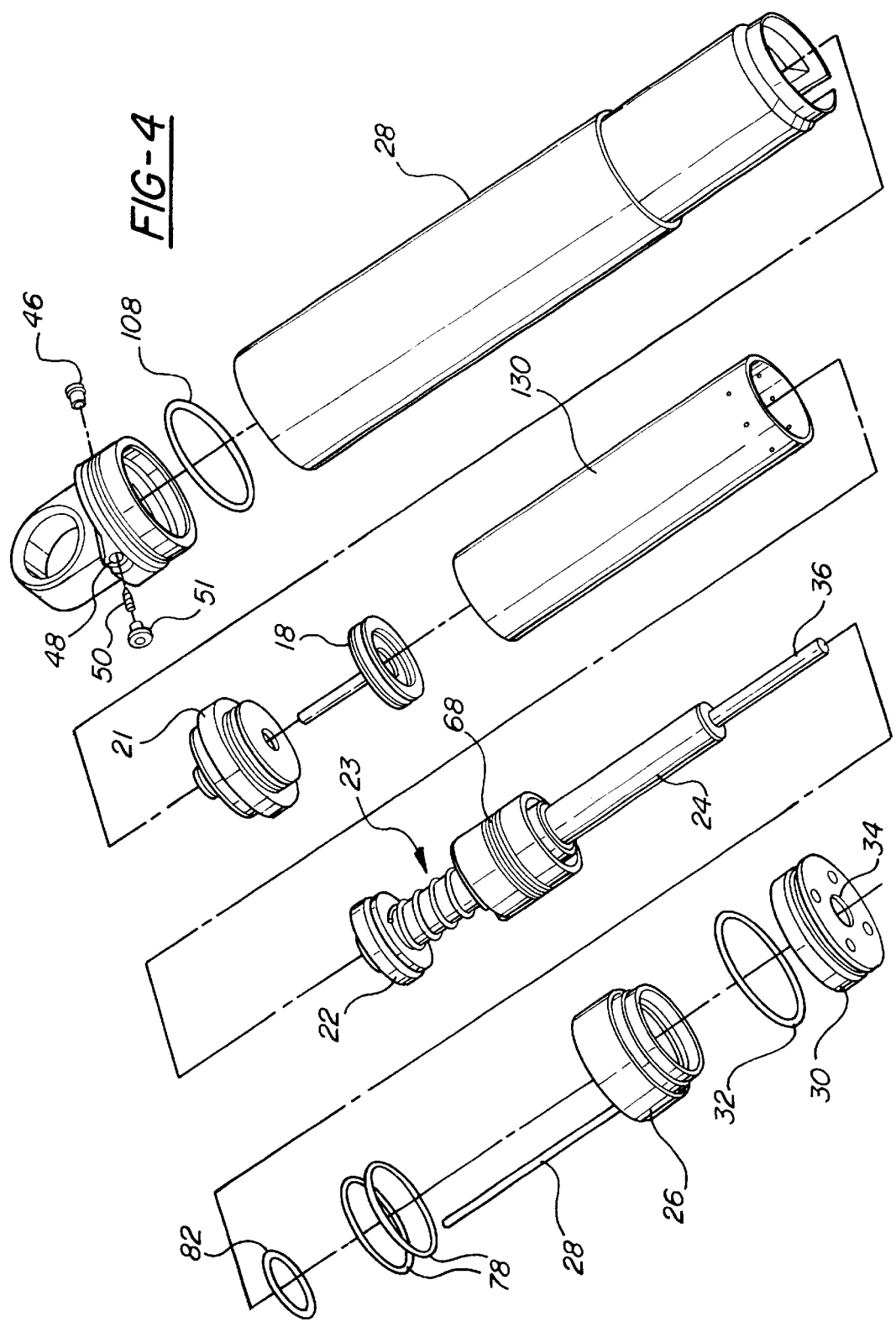

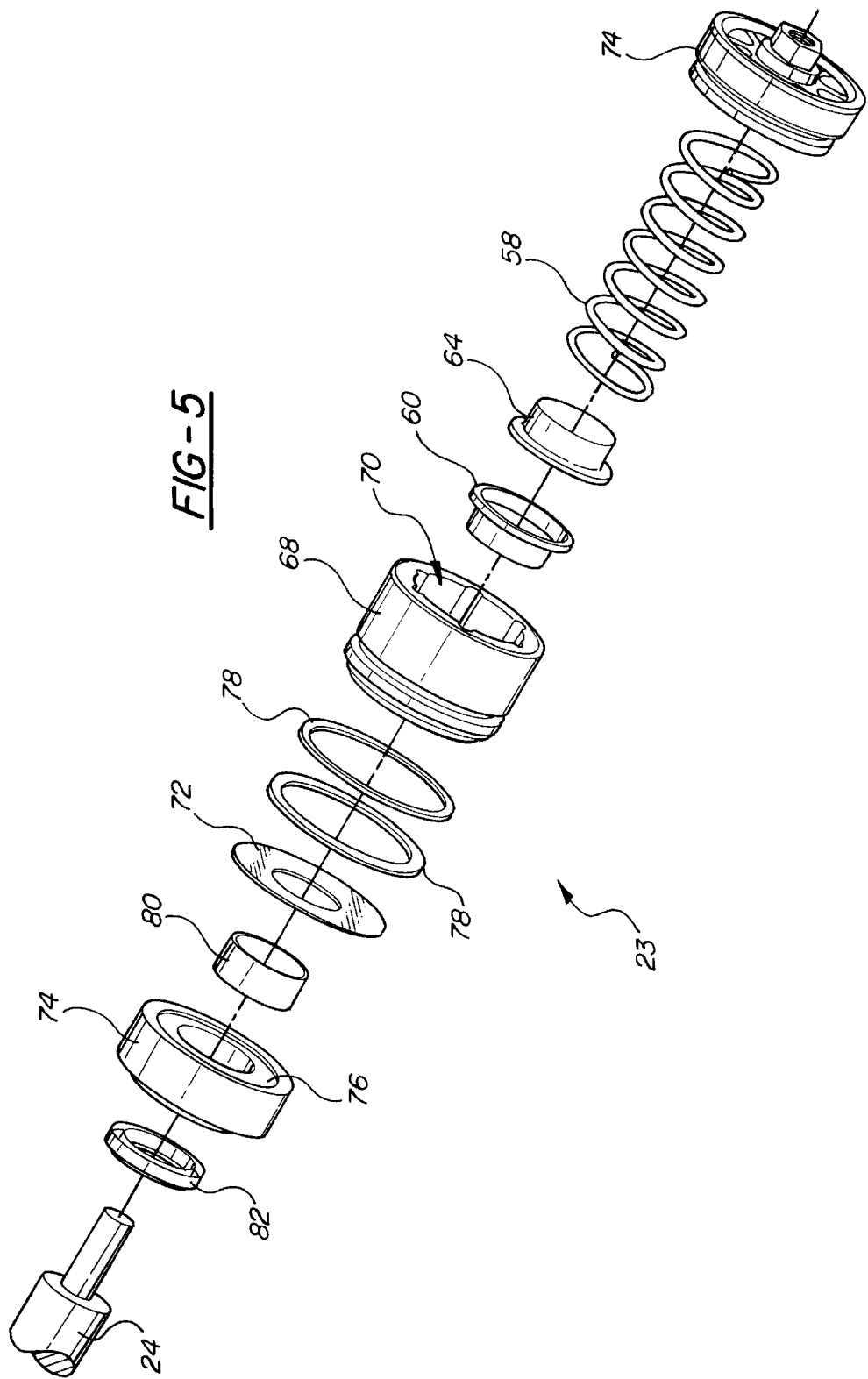

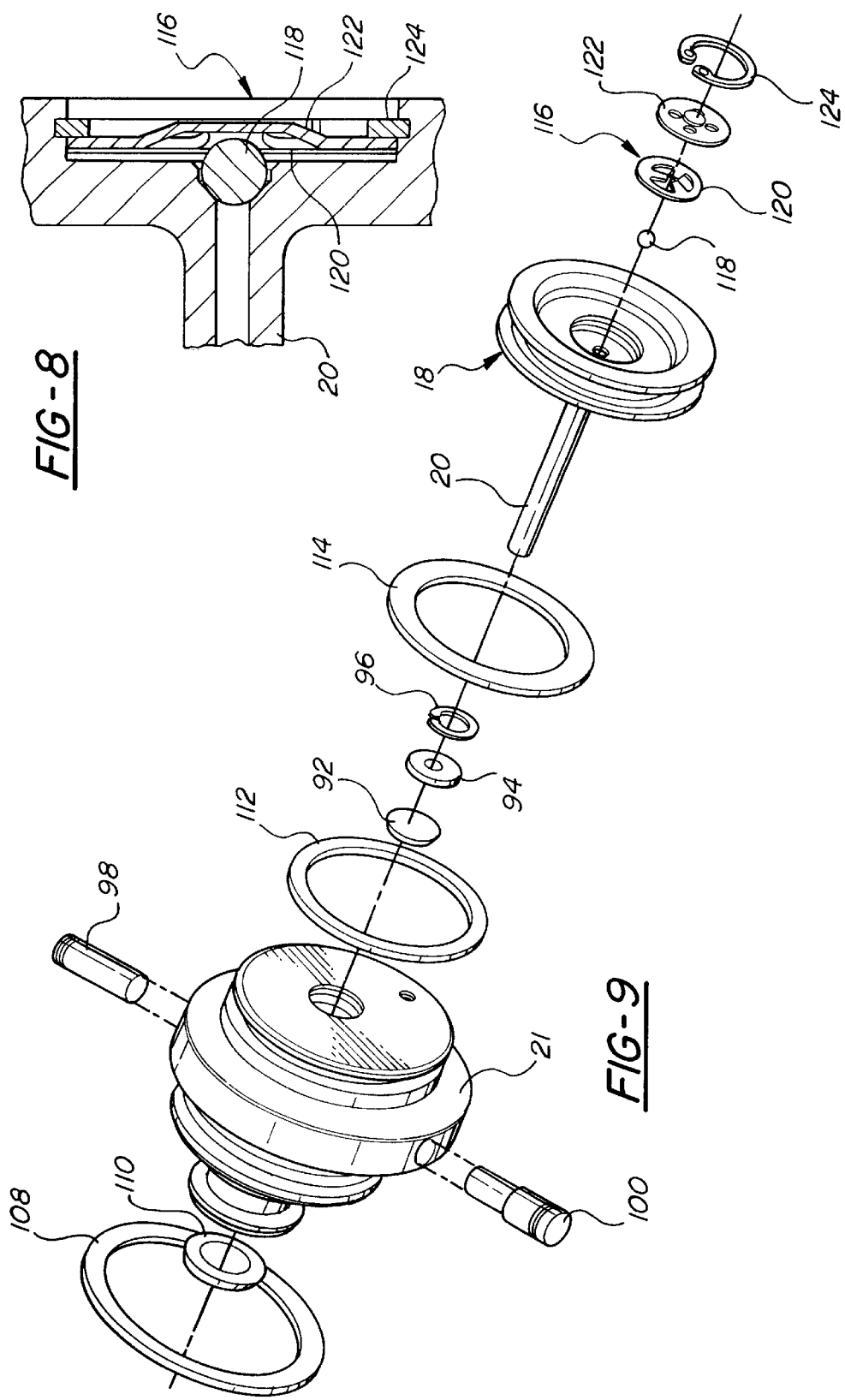

SELF LEVELING VEHICLE SUSPENSION DAMPER

TECHNICAL FIELD

The present invention relates generally to an improved suspension damper for a motor vehicle. More specifically, the present invention relates to a suspension damper capable of adjusting the height of the motor vehicle.

BACKGROUND OF THE INVENTION

Suspension dampers are typically attached to a spring assembly of a vehicle suspension system to dampen vibrations derived from such variables as rough road surfaces, pot holes, and unbalanced tires. The spring force generally determines the height of the vehicle and the damper controls the dynamic vehicle motion. Often, it is desirable to supplement the spring force to maintain a controlled vehicle height at different levels of vehicle load. One method of doing so is to affix a height leveling damper to the suspension system that adjusts the height of the vehicle relative to the load on the vehicle.

Presently, to maintain the controlled vehicle height, the spring force is supplemented with an air leveling damper that requires an external compressor and controller. An air sleeve is attached to the outside of the air leveling damper to supply an extending force to the damper for maintaining the controlled vehicle height. This type of damper adds a significant amount of mass to the vehicle due to the addition of the compressor and the controller. Further, the controller associated with the air leveling damper requires sensors and related electronics to adjust the height of the vehicle.

Therefore, it would be desirable to utilize a self leveling damper with the vehicle suspension system that does not require additional external components such as an air compressor and a controller.

SUMMARY OF THE INVENTION

The present invention is a suspension damper assembly capable of adjusting the height of an automobile. A cylinder tube defining a pumping chamber is aligned concentrically within a reservoir tube. A fluid reservoir is formed between the reservoir tube and the cylinder tube. A piston has a plunger slideably disposed within the cylinder tube. The plunger is affixed to a piston shaft inserted through a first end of the reservoir tube. The shaft is inserted through a shaft guide that seals the pumping chamber from the fluid reservoir at the first end.

A gas cup is slideably disposed within the assembly forming a fluid chamber within the cylinder tube with the shaft guide. The gas cup also forms a gas chamber with a second end of the cylinder tube. The gas cup includes a cup conduit connecting the pumping chamber to the reservoir chamber. When the gas cup pumps fluid into the pumping chamber, fluid pressure inside the pumping chamber is increased providing a force that telescopes the shaft outwardly of the cylinder tube thereby raising the height of the vehicle.

The shaft is inserted through a spring that biases the plunger away from the shaft guide retracting the shaft into the cylinder tube. The shaft guide includes a shaft conduit connecting the fluid chamber to the reservoir. The shaft conduit is sealed with a shaft valve wherein compression of the spring opens the shaft valve allowing fluid to pass from the pumping chamber to the reservoir chamber thereby reducing the outward force of the piston and lowering the height of the vehicle.

The suspension damper of the present invention adjusts the height of the vehicle using mechanisms completely concealed within the damper. The damping action of the piston transfers fluid throughout the damper to adjust the height of the vehicle according to the load on the vehicle. Unlike height adjusting dampers presently available, external compressor or electronic controllers are not required.

BRIEF DESCRIPTION OF THE DRAWINGS

Other advantages of the present invention will be readily appreciated as the same becomes better understood by reference to the following detailed description when considered in connection with the accompanying drawings wherein:

FIG. 1 is a plan view of the damper assembly of the subject invention;

FIG. 3 is a partial sectional view along line 3—3 of FIG. 1 showing the piston assembly;

FIG. 4 is an exploded view of the damper assembly of the subject invention;

FIG. 5 is an exploded view of the piston assembly;

FIG. 8 is a partial sectional view of the gas cup; and

FIG. 9 is an exploded view of the gas cup and the cylinder end assembly.

DESCRIPTION OF THE PREFERRED EMBODIMENT

Figure 2:
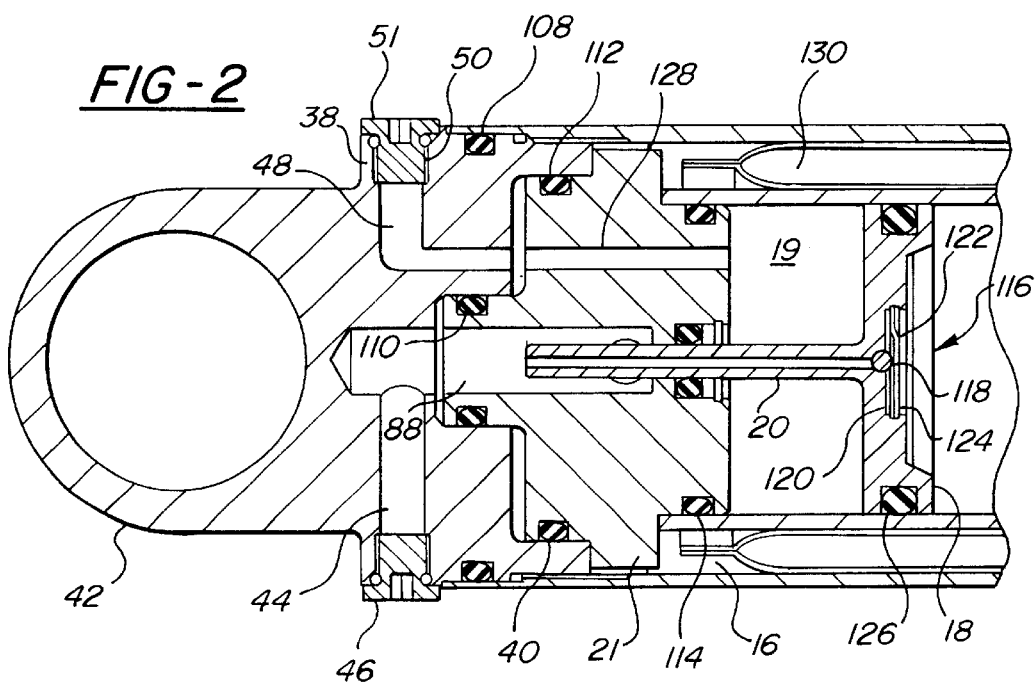
FIG. 2 is partial sectional view along line 2—2 of FIG. 1 showing the gas cup.
Figure 2A:
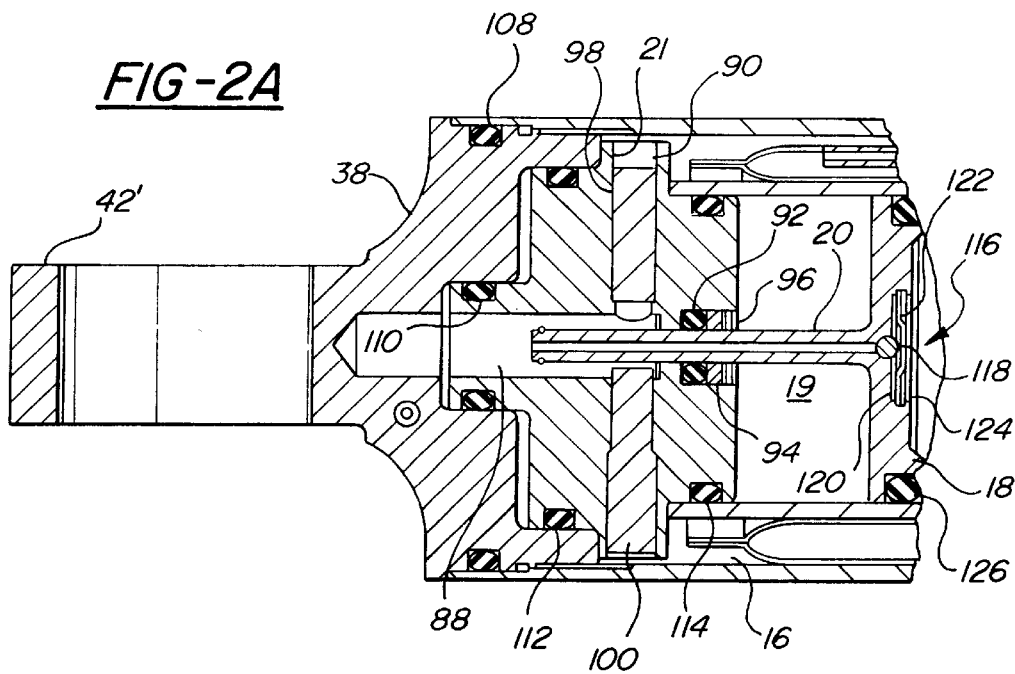
FIG. 2a is a partial sectional view along line 2—2 of FIG. 1 showing an alternate section of the gas cup.

Referring to FIGS. 1 and 3, a suspension damper assembly capable of adjusting the height of an automobile is generally shown at 10. A reservoir tube 12 forms a housing and has a cylinder tube 14 concentrically aligned within the reservoir tube 12. The cylinder tube 14 defines a pumping chamber 13. A fluid reservoir 16 is defined between the reservoir tube 12 and the cylinder tube 14. As shown in FIGS. 2 and 2a, a gas cup 18 is slideably disposed within the cylinder tube 14. The gas cup 18 and a cup conduit 20 are located in the pumping chamber 13 with the fluid reservoir 16, the purpose of which will be explained further below. A cylinder end assembly 21 encloses the end of the pumping chamber 13 and forms a gas chamber 19 with the gas cup 18.

Referring to FIGS. 3 and 4, a piston assembly 22 includes a plunger 23 slideably disposed within the cylinder tube 14. The plunger 23 is affixed to a piston shaft 24 that is inserted through a tube adapter 26 disposed upon an end of the reservoir tube 12 opposite the gas cup 18. The tube adapter 26 includes a fluid relief tube 28, the purpose of which will be explained further below. An end cover 30 is threaded onto the reservoir tube 12 and retains the tube adapter 26 to enclose the end of the reservoir tube 12. An end cover seal 32 seals the end cover 30 to the reservoir tube 12 thereby preventing fluid from leaking from the assembly 10. The end cover 30 includes an end cover aperture 34 that receives the piston shaft 24. The piston shaft 24 includes a fastening element 36 that affixes the assembly 10 to a suspension frame (not shown).

A base cap 38 encloses the opposite end of the reservoir tube 12 and receives the cylinder end assembly 21 as shown in FIGS. 1, 2, and 2a. The base cap 38 is sealed to the cylinder end assembly 21 with a base seal 40. The base cap 38 includes a base fastening element 42 to affix the assembly 10 to the suspension system of the vehicle. The base cap 38 includes a fluid fill aperture 44 for filling the fluid reservoir 16 with fluid. A fluid fill plug 46 seals the fluid fill aperture 44. The base cap 38 further includes a gas fill aperture 48 that connects to the gas chamber 19 for filling the gas chamber 19. A gas check valve 50 is disposed within the gas fill aperture 48 for preventing gas from exiting the gas chamber 19 during filling. A gas cap 51 seals the gas fill aperture 48.

Figure 6:
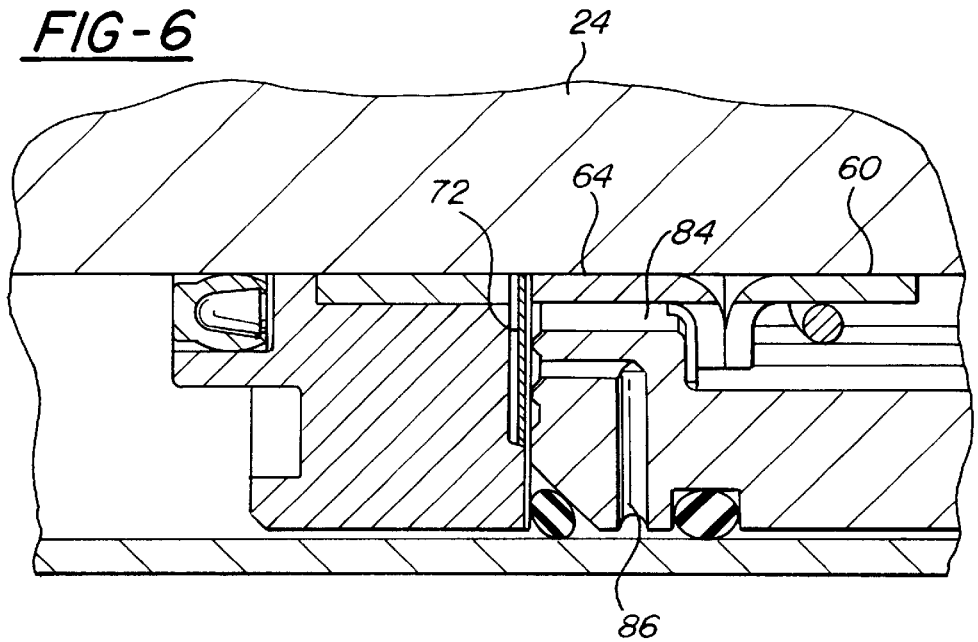
FIG. 6 is a partial section view of the valve seat showing the cavity passage and the vent passage having the valve plate closed.
Figure 7:
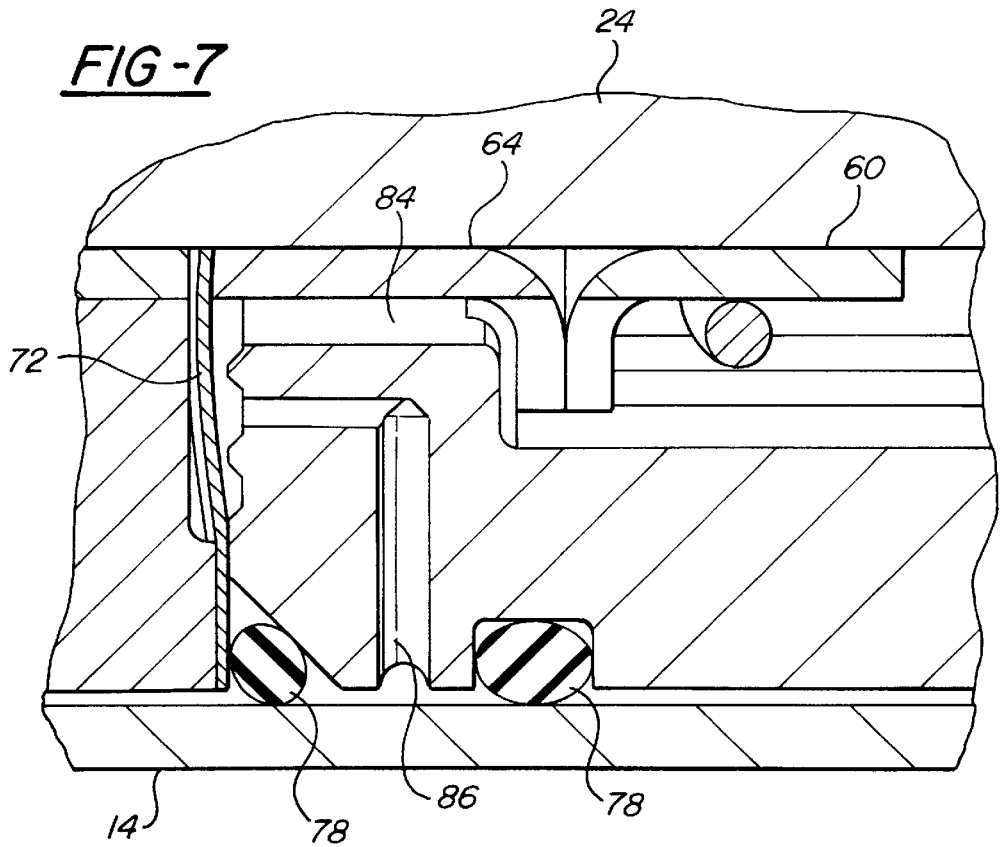
FIG. 7 is a partial section view of the valve seat showing the cavity passage and the vent passage having the valve plate opened.

The novel features of the piston assembly 10 are best shown in FIGS. 3, 6 and 7. The plunger 23 includes a plurality of passages 54 that allow the fluid to flow therethrough while the plunger 23 strokes inside the pumping chamber 13 as is well known in the art of suspension dampers. The passages 54 are designed to restrict, but not prevent the flow of fluid. A plunger plate 56 blocks the passages 54, but flexes under the force of the fluid to open the passages 54 for allowing the fluid to flow through.

The piston shaft 24 is inserted through a spring 58 that is aligned on the piston shaft 24 with a spring bearing 60. The spring 58 is disposed between the spring bearing 60 and the plunger 23. The spring bearing 60 includes a spring rim 62 that prevents the spring 58 from sliding off of the spring bearing 60. A valve lifter 64 includes a lifter rim 66 that abuts the spring rim 62. A valve seat 68 includes a valve seat cavity 70 (FIG. 5) for receiving both the valve lifter 64 and the spring bearing 60. A seal plate 72 is disposed between the valve seat 68 and a shaft washer 74. The shaft washer 74 includes a recess 76, which has a diameter smaller than the diameter of the seal plate 72. The valve seat 68 and the shaft washer 74 are inserted into the cylinder tube 14 along with the piston shaft 24 and the plunger 23. A pair of valve seat seals 78 seal the valve seat 68 to the cylinder tube 14. A shaft bearing 80 aligns the piston shaft 24 within the shaft washer 74. A shaft seal 82 is received by the shaft washer 74 thereby sealing the piston shaft 24 to the shaft washer 74 to prevent fluid from leaking from the assembly 10.

As best shown in FIGS. 6 and 7, the valve seat cavity 70 includes a plurality of cavity passages 84, and a plurality of vent passages 86, which are aligned outside of and concentrically with the cavity passages 84. The cavity passages 84 lead to the pumping chamber 13 and the vent passages 86 lead to the fluid reservoir 16. The cavity passages 84 and the vent passages 86 are both sealed by the seal plate 72.

The valve lifter 64 abuts the seal plate 72. As will be described further below, pressure in the pumping chamber 13 can increase during operation of the vehicle. As pressure increases, the plunger 23 exerts force on the spring 58 transferring force to the spring bearing 60 and to the valve lifter 64. The increased force will cause the valve lifter 64 to flex the seal plate 72 into the recess 76 disposed upon the shaft washer 74 causing the cavity passage 84 to be unsealed, which allows fluid to flow out of the pumping chamber 13. The flexed seal plate 72 also unseals the vent passage 86 allowing fluid to flow from the cavity passage 84 into the vent passage 86 and into the fluid reservoir 16 where the fluid pressure is lower than in the pumping chamber 13.

Referring again to FIGS. 2 and 2a, the cylinder end assembly 21 includes a central cylinder end aperture 88 that receives the cup conduit 20. The cylinder end aperture 88 communicates with the fluid reservoir 16 through a cylinder end connection tube 90 (FIG. 2a). A conduit seal 92 seals the cup conduit 20 to the cylinder end assembly 21. A seal retainer 94 and a retainer ring 96 secure the conduit seal 90 to the cup conduit 20. The conduit seal 92 prevents fluid from leaking from the central cylinder end aperture 88 into the gas chamber 19.

A commercial check valve 98 is inserted into the cylinder end connection tube 90 for preventing fluid from leaving the cylinder end aperture 88 and entering the fluid reservoir 16. The cylinder end assembly 21 further includes a pressure relief valve 100 that would allow the emergency pressure release if the fluid pressure in the cylinder end aperture reaches a critical level.

The base cup 38 encloses the assembly 10 and receives the cylinder end assembly 21. The central cylinder end aperture 88 communicates with the fluid fill aperture 44 disposed within the base cup 38. A base seal 108 seals the base cup 38 to the reservoir tube 12.

A first cylinder base seal 110 seals the cylinder end aperture 88 to the base cup 38 for preventing fluid from leaking from the cylinder end aperture 88. A second cylinder base seal 112 separately seals the cylinder end assembly 21 to the base cup 38. A cylinder seal 114 seals the cylinder end assembly 21 to the cylinder tube 14.

As best shown in FIGS. 8 and 9, the gas cup 18 includes a check valve 116 that allows fluid to flow into the pumping chamber 13 from the fluid reservoir 16 though the cup conduit 20. The check valve 116 includes a ball 118 that is forced against the cup conduit 20 by a ball spring 120. The force of fluid passing through the cup conduit 20 from the fluid reservoir 16 when the gas cup 18 is stroking forces the ball away from the conduit 20. The ball spring 120 forces the ball 118 against the cup conduit 20 when the force of fluid disposed within the pumping chamber 13 is not able to overcome the force of the ball spring 120. A travel limiter 122 abuts the ball spring 120 for preventing the ball 118 from passing through the ball spring 120. A retention ring 124 retains the ball 118, the ball spring 120, and the travel limiter 122 to the gas cup 18. The gas cup 18 includes a cup seal 126 (FIGS. 2, 2a) that encircles the gas cup 18 sealing the gas cup 18 to the cylinder tube 14. The cup seal 126 prevents gas from leaving the gas chamber 19 and entering the pumping chamber 13. The cup seal 126 also prevents fluid from leaving the pumping chamber 13 and entering the gas chamber 19. The cylinder end assembly 21 includes a passage 128 that communicates with the gas fill aperture 48 for filling the gas chamber 19 with gas.

A gas bag 130 is disposed within the fluid reservoir 16 as is known in the art of suspension damper assemblies. The relief fluid tube 28 is positioned within the fluid reservoir 16 adjacent to gas bag 130. The relief fluid tube 28 receives fluid from the vent passage 86 to return fluid to the fluid reservoir 16 from the pumping chamber 13 when the seal plate 72 has been flexed by the valve lifter 64.

During operation, the piston assembly 22 will stroke inside the pumping chamber 13 when vibrations are received from the suspension system from such variables as, for example, pot holes, rough road surfaces and unbalanced tires. The stroking action will transfer fluid pressure to the gas cup 18 causing the gas cup 18 to compress the gas chamber 19. Therefore, the gas cup 18 derives stroking action from the piston assembly 22. The stroking action of the gas cup 18 pumps fluid from the cylinder end aperture 88 into the pumping chamber 13. As the fluid in the cylinder end aperture 88 is depleted, a pressure drop is created in the cylinder end aperture 88 drawing fluid from the fluid reservoir 16 into the cylinder end aperture 88.

As fluid pressure builds in the pumping chamber 13 from the combination of additional fluid and compressed gas in the gas chamber 19, the piston assembly 22 compresses the spring 58 causing the piston shaft 24 to telescope out of the assembly 10 automatically raising the height of the vehicle. As the amount of fluid increases in the pumping chamber 13, pressure is exerted upon the gas cup 18, which in turn decreases the volume of gas chamber 19. As a result, the gas pressure in the gas chamber 19 is increased, which increases the fluid pressure in the pumping chamber 13. The increased fluid pressure in the pumping chamber 19 increases the force of the piston shaft 24, which will telescope the shaft 24 out of the tube 28 thereby raising the level of the vehicle.

The compression force of the spring 58 by the telescoped piston shaft 24 will cause the valve lifter 64 to flex the seal plate 72 allowing fluid to exit the pumping chamber 13 through the cavity passage 84 and enter the vent passage 86 returning to the fluid reservoir 16. As fluid is evacuated from the pumping chamber 13, the pressure inside the pumping chamber 13 will decrease allowing the spring 58 to retract the piston shaft 20 into the assembly automatically lowering the height of the vehicle. This process of filling and evacuating the pumping chamber 13 with fluid occurs with each stroke of the piston assembly 22. As is readily apparent, the height of the vehicle is determined by the compression force of the spring 58. A spring 58 having a high compression force will more readily cause a valve lifter 64 to flex the seal plate 72 thereby maintaining the vehicle at a lower height. A spring 58 having a lower compression force will less readily cause the valve lifter 64 to flex the seal plate 72, leaving the piston shaft 24 in a telescoped orientation, maintaining the vehicle at a greater height.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A suspension damper assembly capable of adjusting the height of an automobile comprising:
   a reservoir tube having a first end and a second end;
   a cylinder tube defining a pumping chamber and being aligned concentrically within said reservoir tube thereby defining a fluid reservoir between said reservoir tube and said cylinder tube;
   a piston having a plunger slideably disposed within said cylinder tube affixed to a piston shaft inserted through said first end;
   a shaft guide disposed upon said shaft and sealing said pumping chamber from said fluid reservoir at said first end;
   a gas cup slideably disposed within said pumping chamber and having a cup conduit connecting said pumping chamber to said reservoir chamber whereby stroking of said gas cup pumps fluid into said pumping chamber forcing said shaft out of said assembly for raising the height of the vehicle;
   a spring having said shaft inserted therethrough biasing said plunger away from said shaft guide; and
   said shaft guide being channeled to connect said fluid chamber to said reservoir chamber and being sealable wherein compression of said spring allows fluid to pass from said pumping chamber to said reservoir chamber reducing the outward force on said piston for lowering the height of the vehicle.

2. An assembly as set forth in claim 1 wherein said gas cup forms a fluid chamber within said cylinder tube with said shaft guide and forms a gas chamber with said second end of said cylinder tube.

3. An assembly as set forth in claim 1 wherein said shaft guide includes a shaft valve sealing said reservoir chamber from said pumping chamber and being vented upon compression of said spring for allowing fluid to pass from said pumping chamber to said reservoir chamber.

4. An assembly as set forth in claim 3 wherein said shaft valve comprises a shaft washer and a valve lifter having a valve plate disposed therebetween wherein said valve lifter flexes said valve plate for allowing fluid to pass through said shaft conduit.

5. An assembly as set forth in claim 4 wherein said shaft washer includes a recess providing space for said valve plate to flex.

6. An assembly as set forth in claim 5 wherein said valve plate is retained against said shaft washer with a valve seat.

7. An assembly as set forth in claim 6 wherein said shaft washer is aligned concentrically within said valve seat.

8. An assembly as set forth in claim 7 wherein said shaft guide includes a spring bearing being adjacent said valve lifter and receiving said spring thereby transferring force from said spring to said valve lifter.

9. An assembly as set forth in claim 1 wherein said gas cup includes a one way valve ventable to allow fluid to flow from said reservoir chamber to said pumping chamber through said cup conduit.

10. An assembly as set forth in claim 9 wherein said one way valve comprises a ball and a ball spring biasing said ball into said cup conduit.

11. An assembly as set forth in claim 1 further including a first end plug sealing said first end and having said cup conduit inserted therein.

12. An assembly as set forth in claim 11 wherein said end plug includes plug passage connecting said cup conduit to said fluid reservoir and having a one way plug valve disposed therein allowing fluid to flow from said fluid reservoir to said cup conduit.

13. An assembly as set forth in claim 12 wherein said end plug includes pressure relief conduit having a pressure relief valve disposed therein and being channeled with said cup conduit.

14. An assembly as set forth in claim 13 wherein said end plug includes a gas filling passage for filling said gas chamber with gas.

15. An assembly as set forth in claim 14 wherein gas pressure inside said gas chamber is increased by pumping fluid into said pumping chamber.

16. An assembly as set forth in claim 15 wherein increased gas pressure in said gas chamber increases fluid pressure in said pumping chamber thereby increasing the force of said piston shaft telescoping said shaft out of said tube.

17. A suspension damper assembly capable of adjusting the height of an automobile comprising:
   a reservoir tube;
   a cylinder tube defining a pumping chamber and being aligned concentrically within said reservoir tube thereby defining a fluid reservoir between said reservoir tube and said cylinder tube;
   a gas cup slideably disposed within said cylinder tube separating a fluid chamber from a gas chamber inside said cylinder tube and having a cup conduit connecting said fluid reservoir to said fluid chamber;

a piston having a piston shaft slideably disposed within said fluid chamber and being biased inwardly by a spring;

a shaft guide being channeled to connect said fluid chamber to said reservoir chamber and having a seal plate preventing fluid from flowing through said channel; and said seal plate being vented by compression of said spring allowing fluid to flow from said fluid chamber to said fluid reservoir and said gas cup being valved to pump fluid from said fluid reservoir to said fluid chamber.

18. An assembly as set forth in claim 17 wherein said spring includes a force predetermined to lower the vehicle to a predetermined height by venting said seal plate reducing the amount of fluid disposed inside said fluid chamber.

19. An assembly as set forth in claim 18 wherein stroking action by said piston transfers stroking action to said gas cup thereby pumping fluid from said fluid reservoir to said fluid chamber through said cup conduit.

20. An assembly as set forth in claim 19 wherein said gas cup includes a ball valve sealing said cup conduit for preventing fluid from flowing through said conduit from said fluid chamber to said reservoir chamber.

21. An assembly as set forth in claim 20 further including a spring bearing abutting said spring and having said shaft inserted therethrough.

22. An assembly as set forth in claim 21 further including a valve lifter disposed between said spring bearing and said seal plate for transferring spring forces from said spring bearing to said seal plate.

23. An assembly as set forth in claim 22 further including a gas bag disposed within said reservoir chamber.

24. An assembly as set forth in claim 23 wherein gas pressure inside said gas chamber is increased by pumping fluid into said pumping chamber.

25. An assembly as set forth in claim 24 wherein increased gas pressure in said gas chamber increases fluid pressure in said pumping chamber thereby increasing the force of said piston shaft telescoping said shaft out of said tube.

\* \* \* \* \*